United States Patent
Whitehurst et al.

(10) Patent No.: US 9,810,078 B2
(45) Date of Patent: Nov. 7, 2017

(54) ROTARY MACHINES INCLUDING A HYBRID ROTOR WITH AN INTEGRALLY BLADED ROTOR PORTION

(71) Applicant: UNITED TECHNOLOGIES CORPORATION, Hartford, CT (US)

(72) Inventors: Sean A. Whitehurst, South Windsor, CT (US); Patrick James McComb, Cromwell, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 336 days.

(21) Appl. No.: 14/742,438

(22) Filed: Jun. 17, 2015

(65) Prior Publication Data
US 2016/0369638 A1 Dec. 22, 2016

(51) Int. Cl.
F01D 5/02 (2006.01)
F01D 5/30 (2006.01)
F01D 5/34 (2006.01)
F04D 29/32 (2006.01)
F04D 29/64 (2006.01)
F04D 29/66 (2006.01)

(52) U.S. Cl.
CPC ............ F01D 5/3007 (2013.01); F01D 5/34 (2013.01); F04D 29/322 (2013.01); F04D 29/644 (2013.01); F04D 29/666 (2013.01); F05D 2260/961 (2013.01); Y02T 50/672 (2013.01); Y02T 50/673 (2013.01)

(58) Field of Classification Search
CPC . F01D 5/02; F01D 5/3007; F01D 5/34; F04D 29/322; F04D 29/644; F04D 29/666; F05D 2220/32; F05D 2230/51; F05D 2230/53; F05D 2260/961
See application file for complete search history.

(56) References Cited

U.S. PATENT DOCUMENTS

| 4,135,857 A | * | 1/1979 | Pannone | ................. F01D 5/143 416/193 A |
| 7,399,159 B2 | * | 7/2008 | Matheny | ................. F01D 5/147 416/219 R |
| 7,448,844 B1 | | 11/2008 | Johnson | |

FOREIGN PATENT DOCUMENTS

DE 102009004926 7/2010

OTHER PUBLICATIONS

Extended European Search Report dated Dec. 13, 2016 in European Application No. 16174940.3.

* cited by examiner

*Primary Examiner* — Igor Kershteyn
(74) *Attorney, Agent, or Firm* — Snell & Wilmer, L.L.P.

(57) ABSTRACT

Rotary machines including a hybrid rotor with an integrally bladed rotor portion are provided. The integrally bladed rotor portion for the hybrid rotor comprises a rotor disk portion and a blade portion. The rotor disk portion has a peripheral rim configured to mechanically retain an individual rotor blade. The blade portion comprises an integral rotor blade extending outwardly and integrally from the rotor disk portion. The individual rotor blade is configured to extend outwardly from the rotor disk portion in a blade array with the integral rotor blade. The hybrid rotor is also provided and comprises the integrally bladed rotor portion and a plurality of individual rotor blades extending outwardly from the rotor disk portion in a blade array with a plurality of integral rotor blades.

16 Claims, 5 Drawing Sheets

ROTARY MACHINES INCLUDING A HYBRID ROTOR WITH AN INTEGRALLY BLADED ROTOR PORTION

FIELD

The present disclosure relates generally to gas turbine engines. More particularly, the present disclosure relates to rotary machines including a hybrid rotor with an integrally bladed rotor portion.

BACKGROUND

Gas turbine engines (such as those used in electrical power generation or used in modern aircraft) typically include a compressor, a combustor section, and a turbine. The compressor and the turbine typically include a series of alternating rotors and stators. A rotor generally comprises a rotor disk and a plurality of blades. The rotor may be an integrally bladed rotor ("IBR") or a mechanically bladed rotor.

The rotor disk and blades in the IBR are one piece (i.e., integral) with the blades spaced around the circumference of the rotor disk. Conventional IBRs may be formed using a variety of technical methods including integral casting, machining from a solid billet, or by welding or bonding the blades to the rotor disk. Conventional IBRs may include mistuned blades that respond differently at an engine stability pinch point. The "engine stability pinch point" is the engine operating point at which the remaining stability margin (available stability margin less the stability margin consumed by the sum of the external and internal destabilizing factors) is a relative medium. By making the blades have different responses because of their mistuning, the magnitude of a non-integral vibratory response (e.g., flutter) may be lessened. However, mistuned blades may reduce aerodynamic efficiency of the IBR. In addition, machining of an IBR may be difficult because of limited space between blades. For example, as engine cores (e.g., compressors and turbines) get smaller, the space between blades of an IBR shrinks, and the tooling does not shrink, so it is harder to machine the blades of IBRs as a machining head cannot fit between the blades.

Mechanically bladed rotors also have disadvantages. For example, the blades in a mechanically bladed fan rotor of a gas turbine engine may suffer from greater fan blade pull load because there is less rotor disk material to carry the pull load. Greater fan blade pull load increases stress levels on the rotor disk and thus on the rotor and potentially limits rotor life.

SUMMARY

An integrally bladed rotor portion for a hybrid rotor is provided according to various embodiments of the present disclosure. The integrally bladed rotor portion comprises a rotor disk portion and a blade portion. The rotor disk portion has a peripheral rim configured to mechanically retain an individual rotor blade. The blade portion comprises an integral rotor blade extending outwardly and integrally from the rotor disk portion. The individual rotor blade is configured to extend outwardly from the rotor disk portion in a blade array with the integral rotor blade.

A hybrid rotor is provided in accordance with various embodiments of the present disclosure. The hybrid rotor comprises an integrally bladed rotor portion comprising a rotor disk portion having a peripheral rim and a blade portion comprising a plurality of integral rotor blades extending outwardly and integrally from the rotor disk portion. A plurality of individual rotor blades extends outwardly from the rotor disk portion in a blade array with the plurality of integral rotor blades.

A rotary machine is provided in accordance with various embodiments of the present disclosure. The rotary machine comprises an integral rotary body having a plurality of integral blades extending outwardly and integrally from a peripheral rim thereof. Individual blades extend outwardly from the peripheral rim and each is mechanically retained by a mechanical retention slot in the peripheral rim.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion. As used herein, "distal" refers to the direction radially outward, or generally, away from the axis of rotation of a turbine engine. As used herein, "proximal" refers to a direction radially inward, or generally, toward the axis of rotation of a turbine engine.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more."

Various embodiments are directed to rotary machines including a hybrid rotor with an integrally bladed rotor portion. As used herein, the terms "integral", "integrally" or the like means one-piece. In various embodiments, the rotary machine may be a gas turbine engine. The hybrid rotor includes both integral rotor blades (a "first rotor blade configuration") and mechanically retained rotor blades (a "second rotor blade configuration"). Each of first and second rotor blade configurations may be independently tuned to exhibit different responses at the engine stability pinch point without sacrificing efficiency. There may also be other flight conditions where such mistuning may be beneficial. For example, integral responses may also benefit if the blades do not response together. An untwist of the integral rotor blades and the mechanically retained rotor blades may be the same at specified operating conditions. As used herein, the term "untwist" refers to how the blade deforms under the load of an operating engine, i.e., how the blades deform to open or close with the force of air and the engine spinning. The hybrid rotor also provides easier repair and machinability, lowers rotor stress, and permits using different materials for the integral rotor blades relative to the mechanically retained rotor blades. Using different materials for the two different blade configurations may be useful for high and low cycle fatigue issues, mistuning, and in response to a rotor blade that is impacted or released. For example, a lighter material for one rotor blade configuration may be used to reduce its impact on rotor blades of the other rotor blade configuration should it be released.

Figure 1:
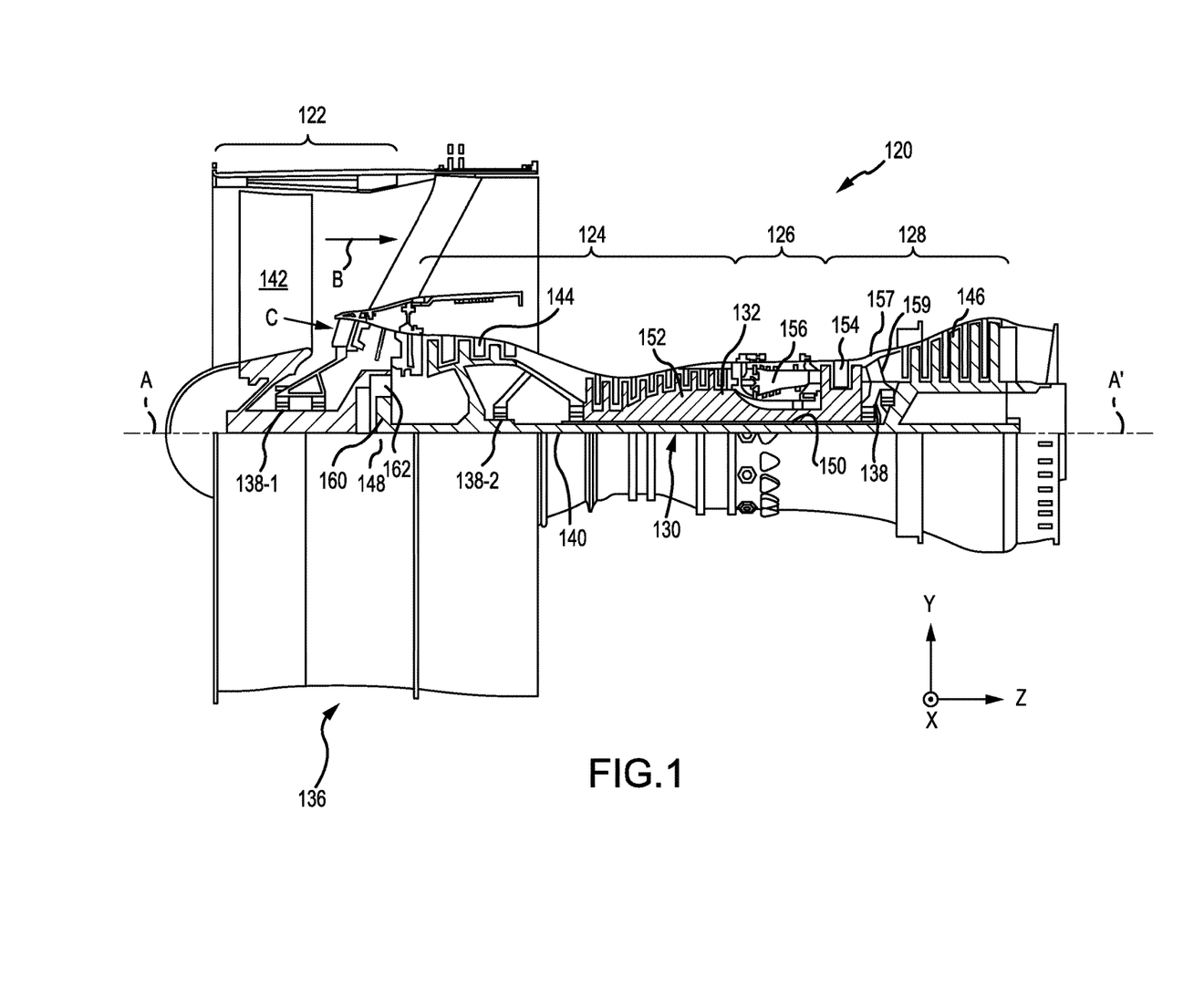
FIG. 1 illustrates a cross-sectional view of a gas turbine engine in accordance with various embodiments.

With reference to FIG. 1, a gas turbine engine 120 is provided. An X-Y-Z axis illustrated in FIG. 1 illustrates the axial (Z), radial (Y) and circumferential (X) directions. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the positive R direction.

Gas turbine engine 120 can be a two-spool turbofan that generally incorporates a fan section 122, a compressor section 124, a combustor section 126 and a turbine section 128. Alternative engines include an augmentor section among other systems or features. In operation, fan section 122 drives coolant along a bypass flow-path B while compressor section 124 drives coolant along a core flow-path C for compression and communication into combustor section 126 then expansion through turbine section 128. Although depicted as a turbofan gas turbine engine 120 herein, it should be understood that the concepts described herein are not limited to use with turbofans as the teachings can be applied to other types of turbine engines including three-spool architectures.

Gas turbine engine 120 generally comprises a low speed spool 130 and a high speed spool 132 mounted for rotation about an engine central longitudinal axis A-A' relative to an engine static structure 136 via several bearing systems 138, 138-1, and 138-2. It should be understood that various bearing systems 138 at various locations can alternatively or additionally be provided, including for example, bearing system 138, bearing system 138-1, and bearing system 138-2.

Low speed spool 130 generally includes an inner shaft 140 that interconnects a fan 142, a low pressure (or first) compressor section 144 and a low pressure (or first) turbine section 146. Inner shaft 140 is connected to fan 142 through a geared architecture 148 that can drive fan 142 at a lower speed than low speed spool 130. Geared architecture 148 includes a gear assembly 160 enclosed within a gear housing 162. Gear assembly 160 couples inner shaft 140 to a rotating fan structure. High speed spool 132 includes an outer shaft 150 that interconnects a high pressure (or second) compressor section 152 and high pressure (or second) turbine section 154. A combustor 156 is located between high pressure compressor 152 and high pressure turbine 154. A mid-turbine frame 157 of engine static structure 136 is located generally between high pressure turbine 154 and low pressure turbine 146. Mid-turbine frame 157 supports one or more bearing systems 138 in turbine section 128. Inner shaft 140 and outer shaft 150 are concentric and rotate via bearing systems 138 about the engine central longitudinal axis A-A', which is collinear with their longitudinal axes. As used herein, a "high pressure" compressor or turbine experiences a higher pressure than a corresponding "low pressure" compressor or turbine.

The core airflow C is compressed by low pressure compressor section 144 then high pressure compressor 152, mixed and burned with fuel in combustor 156, then expanded over high pressure turbine 154 and low pressure turbine 146. Mid-turbine frame 157 includes airfoils 159 which are in the core airflow path. Turbines 146, 154 rotationally drive the respective low speed spool 130 and high speed spool 132 in response to the expansion.

Gas turbine engine 120 is a high-bypass geared aircraft engine. The bypass ratio of gas turbine engine 120 can be greater than about six (6). The bypass ratio of gas turbine engine 120 can also be greater than ten (10). Geared architecture 148 can be an epicyclic gear train, such as a star gear system (sun gear in meshing engagement with a plurality of star gears supported by a carrier and in meshing engagement with a ring gear) or other gear system. Geared architecture 148 can have a gear reduction ratio of greater than about 2.3 and low pressure turbine 146 can have a pressure ratio that is greater than about five (5). The bypass ratio of gas turbine engine 120 can be greater than about ten (10:1). The diameter of fan 142 can be significantly larger than that of the low pressure compressor section 144, and the low pressure turbine 146 can have a pressure ratio that is greater than about five (5:1). Low pressure turbine 146 pressure ratio is measured prior to inlet of low pressure turbine 146 as related to the pressure at the outlet of low pressure turbine 146 prior to an exhaust nozzle. It should be understood, however, that the above parameters are exemplary of particular embodiments of a suitable geared architecture engine and that the present disclosure contemplates other turbine engines including direct drive turbofans.

Figure 2:
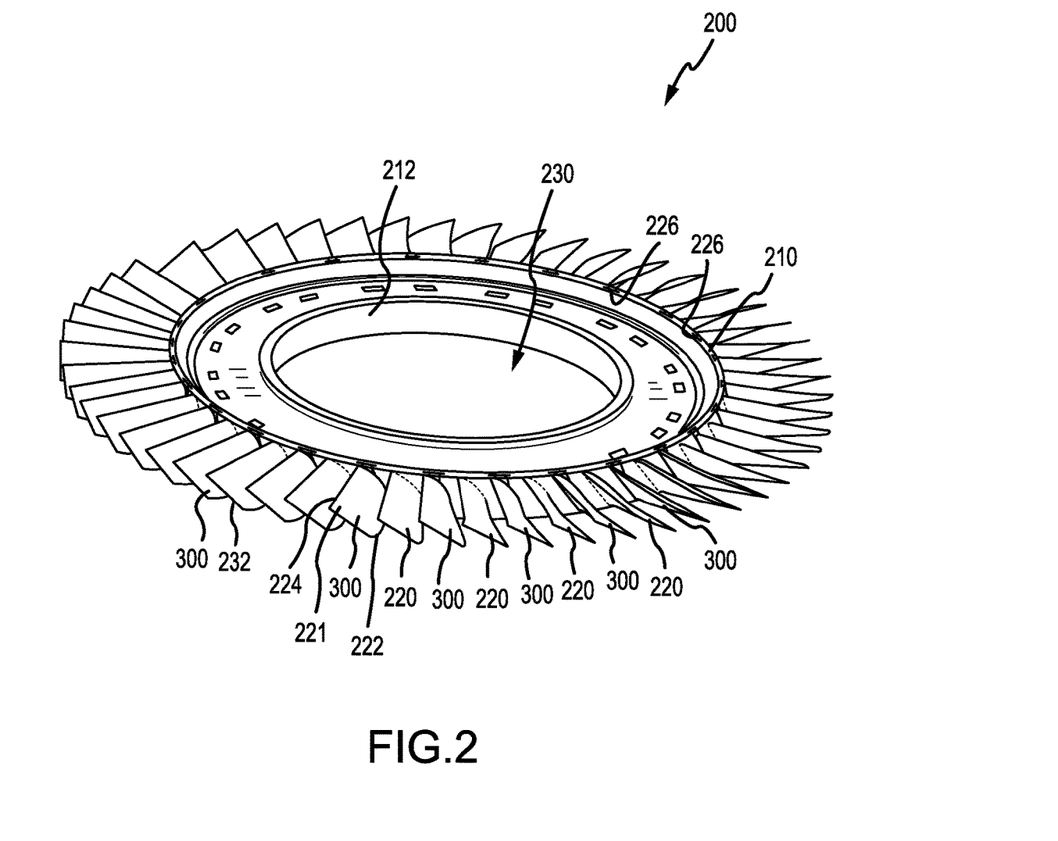
FIG. 2 illustrates a perspective view of a hybrid rotor in accordance with various embodiments.
Figure 4:
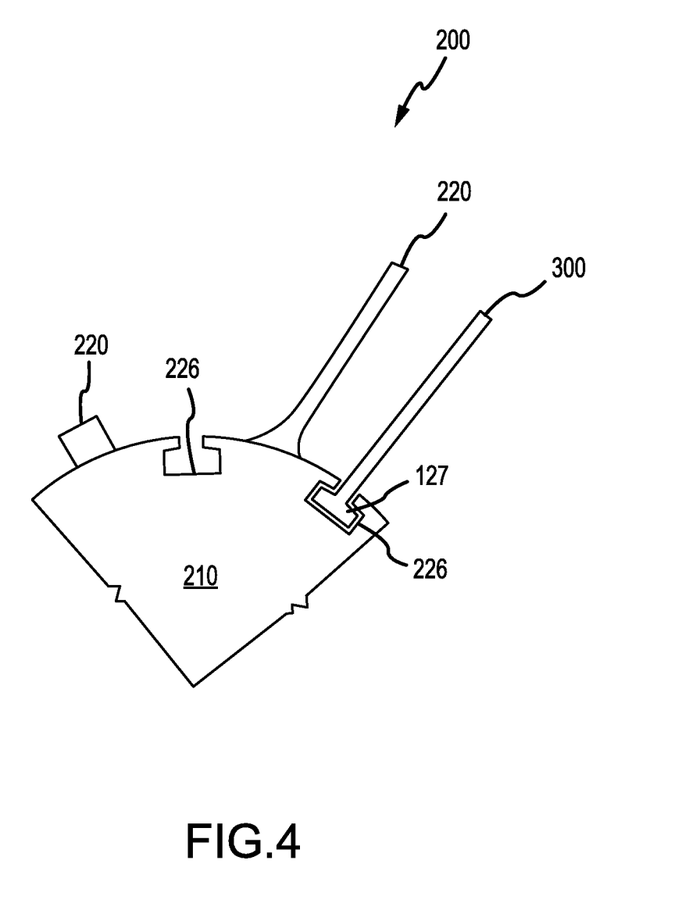
FIG. 4 illustrates a front schematic view of a portion of the hybrid rotor of FIG. 2 including the integrally bladed rotor portion of FIG. 3 in accordance with various embodiments.

Referring now to FIG. 2 illustrating a hybrid rotor 200 according to various embodiments. FIG. 4 is a front view of a portion of the hybrid rotor of FIG. 2. In various embodiments, hybrid rotor 200 may be a rotor in compressor section 124 of gas turbine engine 120 in FIG. 1. In another aspect hybrid rotor 200 may be a rotor in the fan section 122 of the gas turbine engine 120 shown in FIG. 1. In other aspects, hybrid rotor 200 may be located in the turbine section 128 of the gas turbine engine 120. Such description may also be applicable to impellers as well as additional or other stages. It should also be understood that other rotor modules will also benefit from the various embodiments herein described.

Figure 3:
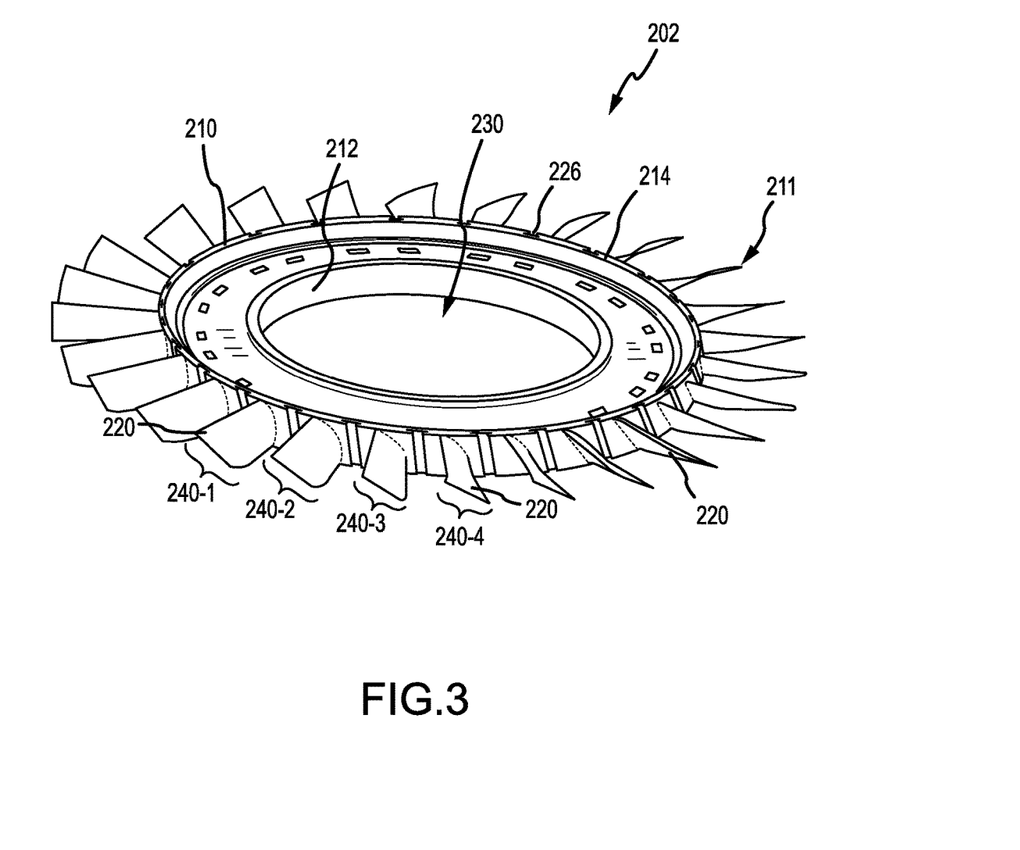
FIG. 3 illustrates a perspective view of an integrally bladed rotor portion of the hybrid rotor of FIG. 2, in accordance with various embodiments.

Still referring to FIGS. 2 and 3, according to various embodiments, hybrid rotor 200 comprises an integrally bladed rotor portion 202 (FIG. 3) and a plurality of individual rotor blades 300. The individual rotor blades 300 are mechanically retained in the hybrid rotor 200. The integrally bladed rotor portion 202 (FIG. 2) comprises a rotor disk portion 210 and a blade portion 211 as one piece. Rotor disk portion 210 includes a rim 214 around the periphery of the rotor disk portion (a "peripheral rim") and a bore 230 defined by an inner circumference 212 of rotor disk portion 210. The blade portion 211 comprises a plurality of integral rotor blades 220 (indicated by dotted lines in FIGS. 2 and 3) circumferentially spaced around the rotor disk portion and extending outwardly and integrally from the rotor disk portion 210. An integral rotor blade 220 comprises an airfoil 221 with a leading edge 222 and trailing edge 224 extending between a root portion 228 and a tip portion 232 defining therebetween first and second opposite sides. The plurality of integral rotor blades 220 is arranged in circumferentially spaced apart sets. Each set comprises one or more integral rotor blades. Each set of the one or more integral rotor blades comprises the same or a different number of integral rotor blades 220. While FIGS. 2 and 3 illustrate the plurality of integral rotor blades 220 depicted there to be arranged in circumferentially spaced sets (e.g., 240-1, 240-2, 240-3, 240-4) of one integral rotor blade each, it is to be understood that one or more of the circumferentially spaced sets of integral rotor blades may have a greater number of integral rotor blades therein.

In various embodiments, the integrally bladed rotor portion 202 (FIG. 3) may be formed using a variety of technical methods including integral casting, machining from a solid billet or by welding or bonding the integral blades 220 of the blade portion 211 to the rotor disk portion 210. The integrally bladed rotor portion 202 includes a mechanical retention slot 226 in the peripheral rim of the rotor disk portion as hereinafter described.

The plurality of individual rotor blades 300 extend outwardly from the rotor disk portion 210 in a blade array with the plurality of integral rotor blades 220. The plurality of individual rotor blades 300 are circumferentially spaced around the circumference of the rotor disk portion 210 and arranged in circumferentially spaced apart sets (e.g., 300-1, 300-2) of one or more individual rotor blades 300. Each set of the one or more individual rotor blades is disposed circumferentially adjacent and between a pair of circumferentially adjacent spaced apart sets (e.g., 240-1, 240-2, 240-3, 240-4) of the integral rotor blades 220. Each set of the one or more individual rotor blades comprises the same or a different number of individual rotor blades.

Still referring to FIGS. 2 through 3 and returning to FIG. 4, the peripheral rim 214 includes the mechanical retention slot 226 disposed between and adjacent each pair of circumferentially adjacent spaced apart sets of the integral rotor blades 220. The number of mechanical retention slots 226 corresponds to the number of individual rotor blades 300 in the blade array. Each mechanical retention slot 226 is configured to retain a corresponding individual rotor blade 300 in the hybrid rotor 200. The individual rotor blades 300 may be axially restrained by a snap ring or the like.

The mechanical retention slots 226 are disposed adjacent and between the root portion 228 of circumferentially adjacent sets of integral rotor blades. As noted previously, the set may comprise one or more integral blades. Each mechanical retention slot 226 is configured to receive and mechanically retain one of the individual rotor blades 300 (more particularly, an integral flange 127 of the individual rotor blade 300 as hereinafter described). Thus, the blade array comprises alternating integral blades 220 and individual blades 300. The individual rotor blades are mechanically retained in the mechanical retention slots 226 in the IBR portion (more particularly, in the peripheral rim 214 of the rotor disk portion 210). Like the integral rotor blade 220, each individual rotor blade 300 comprises an airfoil having a leading edge and a trailing edge extending from a root portion to a tip portion defining therebetween first and second opposite sides. The integral flange 127 is integrally joined to the root portion of the individual rotor blade and may be referred to as a "dovetail".

Figure 5:
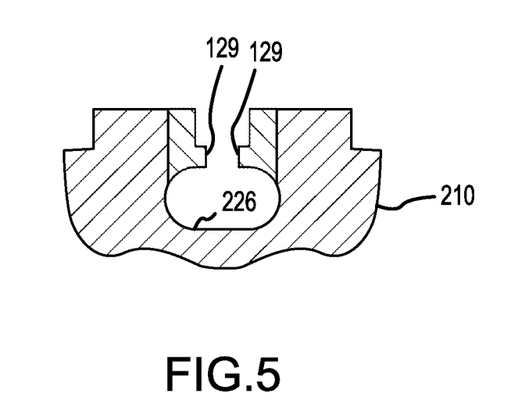
FIG. 5 illustrates a mechanical retention slot of the hybrid rotor of FIG. 2 including opposing overhung portions, in accordance with various embodiments.

Still referring to FIG. 2, the individual rotor blade 300 is schematically illustrated and may include the second blade configuration that permits mechanical retention of the individual blade in the mechanical retention slot in the peripheral rim of the integrally bladed rotor portion. For example, the individual blades 300 illustrated in FIG. 2 each include the integral flange 127 that is configured to be received and retained in the mechanical retention slot as illustrated in FIG. 4. While an integral flange for attaching the individual blade to the IBR portion has been described and illustrated, it is to be understood that other attachment configurations may be used in fabricating the hybrid rotor according to various embodiments. The shape and size of the integral flange 127 complements with the shape and size of the mechanical retention slot 226 so that the individual rotor blade may be retained in the hybrid rotor. Due to space constraints between adjacent blades (between adjacent sets of integral blades) and the curvature of the blades (of the first and/or second configuration), the integral flange/dovetail may be configured so as to permit insertion into the mechanical retention slot without substantial interference from adjacent blades. While FIG. 4 illustrates a simple inverted generally rectangular integral flange, it is to be understood that the shape of the flange and the mechanical retention slot may vary as long as they have complementary shapes and sizes. Referring now to FIG. 5, the mechanical retention slot 226 may include opposing overhung portions 129 and/or angled bearing surfaces that substantially prevent outward radial movement of the flange from the mechanical retention slot. The mechanical retention slots 226 may be axially-oriented or otherwise. As noted previously, the individual rotor blades 300 may also be axially restrained by a snap ring or the like.

FIG. 3 depicts one of two mechanical retention slots (only two are shown) adjacent and between two integral rotor blades (the set in the depicted embodiment) (one of the two integral rotor blades is only partially illustrated). While a single individual blade is depicted adjacent and between a set of two integral rotor blades, it is to be understood that one or more individual blades may be disposed adjacent and between a pair of circumferentially adjacent sets including one or more integral rotor blades. The sets may have the same or a different number of integral rotor blades.

A hybrid combination of materials may be utilized within the hybrid rotor according to various embodiments. For example, the integral blades may be manufactured of a first material and the mechanical blades may be manufactured of a second material. The first and second materials may be the same or different. It should be understood that various materials and combinations thereof may be utilized. For example, the integrally bladed rotor portion may be fabricated from titanium and the individual blades from a composite material. When the integral blades and the individual blades have the same aerodynamic shape, but are fabricated from different materials, the mechanics are different because the materials are different, thereby resulting in a mistuning of the hybrid rotor. A mistuned hybrid rotor is less sensitive to non-integral vibration (e.g., flutter) as well as to integral vibration. The phrase "different materials", as used in this specification, refers to materials having different properties but which may or may not have the same elemental composition. Thus, alloys having the same composition but which are processed differently so as to exhibit differing properties are considered to be "different materials". A hybrid combination of blade characteristics may be utilized within the hybrid rotor according to various embodiments. The integral blades may be mistuned relative to the individual blades so that the integral blades respond differently at the engine stability pinch point. Similarly, the thickness (as measured from opposite sides of the airfoil) may differ between the integral blades and the individual blades to intentionally mistune the blades in the blade array to substantially alleviate the non-integral vibratory response.

Based on the foregoing, it is to be appreciated that because the hybrid rotor according to various embodiments includes two different blade configurations, namely integral blades and individual blades, the hybrid rotor provides several advantages over conventional mechanically bladed rotors and conventional integrally bladed rotors. For example, the hybrid rotor according to various embodiments permits the individual blades to be tuned independently from the integral blades. Mistuned blades may be configured with the same untwist shape at specified operating conditions and a frequency separation to substantially prevent non-integral vibratory responses may also be implemented. The two different blade configurations in the hybrid rotor according to various embodiments may also improve reparability of the integral blades and reduce rotor stress. By removing (temporarily) an adjacent individual blade for repair of the hybrid rotor, removal and re-welding of the integral blade may be simplified. Rotor stress may be reduced as the solid rotor disk material below the integral blades compensates for the stresses in the mechanical retention slots. The part count of the hybrid rotor may be reduced relative to the conventional mechanically bladed rotor. For example, the platforms between blades may be removed and integrated into the hybrid rotor. The part count and machining time may be reduced relative to the conventional IBR. For example, less post-welding would be required (because of fewer welded blades) and the number of seals may be reduced with less leakage. Machining of the hybrid rotor relative to the conventional IBR may be simplified as there is more space around the rim of the rotor disk in the hybrid rotor, making machining faster and easier.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An integrally bladed rotor portion for a hybrid rotor, the integrally bladed rotor portion comprising:
    a rotor disk portion having a peripheral rim configured to mechanically retain an individual rotor blade, wherein the individual rotor blade comprises a plurality of individual rotor blades spaced around the circumference of the rotor disk portion in circumferentially spaced apart sets, each set comprising at least one individual rotor blade; and
    a blade portion comprising an integral rotor blade extending outwardly and integrally from the rotor disk portion, the individual rotor blade configured to extend radially outwardly from the rotor disk portion in a blade array with the integral rotor blade, wherein the integral rotor blade comprises a plurality of integral rotor blades spaced around a circumference of the rotor disk portion in circumferentially spaced apart sets, each set comprising one or more integral rotor blades;
    wherein each set of the one or more individual rotor blades is disposed circumferentially adjacent and between a pair of adjacent circumferentially spaced apart sets of the integral rotor blades.

2. The integrally bladed rotor portion of claim 1, wherein the peripheral rim includes a mechanical retention slot disposed between and adjacent the pair of adjacent circumferentially spaced apart sets of the integral rotor blades, the number of mechanical retention slots corresponding to the number of individual rotor blades in the blade array.

3. The integrally bladed rotor portion of claim 1, wherein each set of the at least one or more integral rotor blades comprises the same or a different number of integral rotor blades and each set of the one or more individual rotor blades comprises a different number of individual rotor blades.

4. The integrally bladed rotor portion of claim 1, wherein the plurality of individual rotor blades and the plurality of integral rotor blades respectively comprise the same or different materials.

5. The integrally bladed rotor portion of claim 1, wherein the plurality of individual rotor blades and the plurality of integral rotor blades are respectively independently tuned.

6. The integrally bladed rotor portion of claim 2, wherein the individual rotor blade comprises:
an airfoil having a leading edge and a trailing edge extending from a root portion to a tip portion defining therebetween first and second opposite sides; and
a flange integrally joined to the root portion and received in the mechanical retention slot.

7. The integrally bladed rotor portion of claim 6, wherein each mechanical retention slot includes opposing overhung portions cooperating with the flange to retain the individual rotor blade in the integrally bladed rotor portion.

8. A hybrid rotor comprising:
an integrally bladed rotor portion comprising a rotor disk portion having a peripheral rim and a blade portion comprising a plurality of integral rotor blades extending outwardly and integrally from the rotor disk portion; and
a plurality of individual rotor blades extending outwardly from the rotor disk portion in a blade array with the plurality of integral rotor blades;
wherein the plurality of integral rotor blades are spaced around a circumference of the rotor disk portion in circumferentially spaced apart sets, each set comprising one or more integral rotor blades and the plurality of individual rotor blades are spaced around the circumference of the rotor disk portion in circumferentially spaced apart sets of one or more individual rotor blades, wherein each set of the one or more individual rotor blades is disposed circumferentially adjacent and between a pair of adjacent circumferentially spaced apart sets of integral rotor blades.

9. The hybrid rotor of claim 8, wherein the peripheral rim includes a mechanical retention slot disposed between and adjacent the pair of adjacent circumferentially spaced apart sets of integral rotor blades, the number of mechanical retention slots corresponding to the number of individual rotor blades in the blade array and each mechanical retention slot configured to retain an individual rotor blade of the hybrid rotor.

10. The hybrid rotor of claim 9, wherein each set of the one or more integral rotor blades comprises the same or a different number of integral rotor blades and each set of the one or more individual rotor blades comprises the same or a different number of individual rotor blades.

11. The hybrid rotor of claim 8, wherein the plurality of individual rotor blades and the plurality of integral rotor blades respectively comprise the same or different materials.

12. The hybrid rotor of claim 8, wherein the plurality of individual rotor blades and the plurality of integral rotor blades are respectively independently tuned for effecting a different response at an engine stability pinch point.

13. The hybrid rotor of claim 8, wherein each individual rotor blade comprises:
an airfoil having a leading edge and a trailing edge extending from a root portion to a tip portion defining therebetween first and second opposite sides; and
a flange integrally joined to the root portion and received in the mechanical retention slot, wherein each mechanical retention slot includes opposing overhung portions cooperating with the flange to retain the individual rotor blade in the blade array.

14. A rotary machine comprising:
an integral rotary body having a plurality of integral blades extending outwardly and integrally from a peripheral rim thereof; and
a plurality of individual blades extending outwardly from the peripheral rim and mechanically retained by a mechanical retention slot in the peripheral rim;
wherein each integral blade of the plurality of integral blades is circumferentially disposed between adjacent individual blades of the plurality of individual blades and wherein each individual blade of the plurality of individual blades is circumferentially disposed between adjacent integral blades of the plurality of integral blades.

15. The rotary machine of claim 14, wherein the integral rotary body is an integrally bladed rotor portion and the rotary machine comprises a gas turbine engine.

16. The rotary machine of claim 14, wherein the integral rotary body comprises an integrally bladed impeller portion and the rotary machine comprises a gas turbine engine.

* * * * *